(12) United States Patent
Jägenstedt et al.

(10) Patent No.: US 9,475,196 B2
(45) Date of Patent: Oct. 25, 2016

(54) DETACHABLE USER INTERFACE FOR A ROBOTIC VEHICLE

(71) Applicant: Husqvarna AB, Huskvarna (SE)

(72) Inventors: Patrik Jägenstedt, Tenhult (SE); Magnus Öhrlund, Malmbäck (SE); Olle Markusson, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/408,850

(22) PCT Filed: Jun. 24, 2013

(86) PCT No.: PCT/SE2013/050757
§ 371 (c)(1),
(2) Date: Dec. 17, 2014

(87) PCT Pub. No.: WO2014/003644
PCT Pub. Date: Jan. 3, 2014

(65) Prior Publication Data
US 2015/0174766 A1    Jun. 25, 2015

Related U.S. Application Data

(60) Provisional application No. 61/664,252, filed on Jun. 26, 2012.

(51) Int. Cl.
*B25J 13/06* (2006.01)
*B25J 13/00* (2006.01)
*G06F 3/048* (2013.01)
*G06F 3/16* (2006.01)
*B25J 9/00* (2006.01)
*B25J 11/00* (2006.01)

(52) U.S. Cl.
CPC .............. *B25J 13/06* (2013.01); *B25J 9/0003* (2013.01); *B25J 11/008* (2013.01); *B25J 13/006* (2013.01); *G06F 3/048* (2013.01); *G06F 3/167* (2013.01)

(58) Field of Classification Search
CPC ....... B25J 13/06; B25J 13/006; G06F 3/048; G06F 3/167
See application file for complete search history.

(56) References Cited

U.S. PATENT DOCUMENTS 5,839,097 A * 11/1998 Klausner .............. G05B 19/042
340/12.3
6,113,343 A * 9/2000 Goldenberg ............ B25J 5/005
239/587.2

(Continued)

*Primary Examiner* — Ian Jen
(74) *Attorney, Agent, or Firm* — Nelson Mullins Riley & Scarborough LLP (57) ABSTRACT

A robotic vehicle may include control circuitry, a device interface and a detachable user interface. The control circuitry may be configured to execute stored instructions to direct operation of the robotic vehicle on a defined area. The device interface may enable electronic communication of a device with the control circuitry. The detachable user interface may be configured to be removably mated with the robotic vehicle to enable communication between the detachable user interface and the control circuitry via the device interface. The detachable user interface may provide user interface capability to enable an operator to define one or more setting parameters or instructions responsive to the detachable user interface being mated with the robotic vehicle for execution by the control circuitry to control operation of the robotic vehicle when the detachable user interface is not mated with the robotic vehicle.

18 Claims, 4 Drawing Sheets

(56) References Cited

U.S. PATENT DOCUMENTS

| | | | | |
|---|---|---|---|---|
| 6,133,847 A | * | 10/2000 | Yang | G05B 19/0426 340/12.25 |
| 2005/0015920 A1 | * | 1/2005 | Kim | A47L 9/1409 15/352 |
| 2005/0287038 A1 | * | 12/2005 | Dubrovsky | G05B 19/409 422/63 |
| 2007/0064092 A1 | * | 3/2007 | Sandbeg | H04N 7/142 348/14.02 |
| 2008/0143889 A1 | * | 6/2008 | Mukaida | H04N 5/642 348/789 |
| 2009/0095096 A1 | * | 4/2009 | Dean | G01T 7/00 73/866 |
| 2010/0171464 A1 | * | 7/2010 | Choi | B25J 5/00 320/114 |
| 2010/0180709 A1 | * | 7/2010 | Choi | B25J 5/007 74/490.05 |
| 2012/0203390 A1 | * | 8/2012 | Lee | H02J 3/14 700/295 |
| 2015/0201555 A1 | * | 7/2015 | Willgert | G05D 1/0246 701/26 |
| 2015/0220086 A1 | * | 8/2015 | Willgert | G05D 1/0214 701/26 |

* cited by examiner

DETACHABLE USER INTERFACE FOR A ROBOTIC VEHICLE

TECHNICAL FIELD

Example embodiments generally relate to robotic vehicles and, more particularly, relate to a robotic vehicle that is configurable to operate responsive to insertion of instructions using a removable user interface.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Lawn mowers are typically capable of transiting over even and uneven terrain to execute yard maintenance activities relating to mowing. However, most lawn mowers are repeatedly exposed to the same operating environments over the course of their lifetimes. For example, a lawn mower may operate to cut a single yard over its entire life, or may operate to cut a relatively fixed series of yards or parcels if it is used for commercial purposes. Given that computing devices are becoming more ubiquitous, it is to be expected that they may be employed to assist in operation of lawn mowers. As such, many additional functionalities may be provided or supported by the employment of computing devices on lawn mowers. Some of the functionalities that may be supported by employing computing devices may require interaction between the operator and the lawn mower. Thus, for example, a Man-Machine Interface (MMI) may be employed on the lawn mower to provide for such interaction.

BRIEF SUMMARY OF SOME EXAMPLES

Some example embodiments may therefore provide a robotic device having an interface module that enables the operator to define operating parameters or otherwise interface with the robotic device. Moreover, some embodiments may provide that the interface module is configured to enable the operator to remove the interface module when it is not in use. This may enable the operators to interface with the robotic device while the interface module is mated with the robotic device, but remove the risk that unauthorized parties are also enabled to interface with the robotic device thereafter, while the device operates (e.g., in an autonomous or self-guided fashion).

According to and example embodiment, a robotic vehicle is provided. The robotic vehicle may include control circuitry, a device interface and a detachable user interface. The control circuitry may be configured to execute stored instructions to direct operation of the robotic vehicle on a defined area. The device interface may enable electronic communication of a device with the control circuitry. The detachable user interface may be configured to be removably mated with the robotic vehicle to enable communication between the detachable user interface and the control circuitry via the device interface. The detachable user interface may provide user interface capability to enable an operator to define one or more setting parameters or instructions responsive to the detachable user interface being mated with the robotic vehicle for execution by the control circuitry to control operation of the robotic vehicle when the detachable user interface is not mated with the robotic vehicle.

In accordance with another example embodiment, a detachable user interface is provided. The detachable user interface may include processing circuitry configured to interface with control circuitry of a robotic vehicle responsive to mating of the detachable user interface with the robotic vehicle via a device interface of the robotic vehicle. The control circuitry may be configured to execute stored instructions to direct operation of the robotic vehicle on a defined area. The detachable user interface may be configured to be removably mated with the robotic vehicle to enable communication between the detachable user interface and the control circuitry via the device interface. The detachable user interface may provide user interface capability to enable an operator to define one or more setting parameters or instructions responsive to the detachable user interface being mated with the robotic vehicle for execution by the control circuitry to control operation of the robotic vehicle when the detachable user interface is not mated with the robotic vehicle.

Some example embodiments may improve the ability of operators and/or fleet managers to make lawn mowers operate safely and/or securely.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

Figure 1:
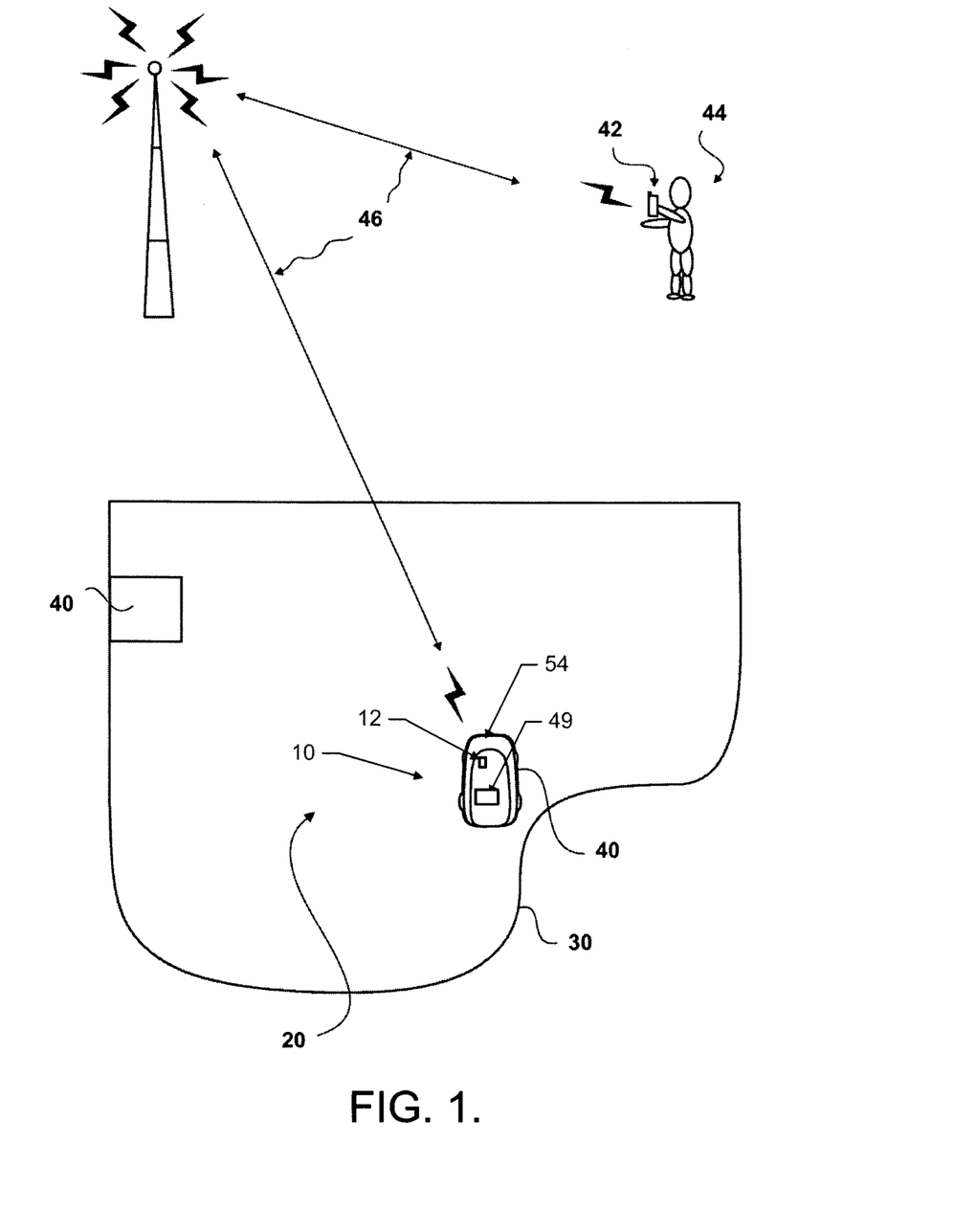
FIG. 1 illustrates an example operating environment for a robotic mower.

Robotic vehicles such as robotic mowers, robotic watering devices, and/or the like, typically operate in an area that is defined by some technical implementation by which to define boundaries such as, for example, a guide wire that bounds the area to be mowed. The robotic vehicle then roams within the bounded area to ensure that the entire area is mowed, watered, etc., but the robotic vehicle does not go outside of the bounded area. FIG. 1 illustrates an example operating environment for a robotic mower 10 that may employ a system bounded by such a guide wire. However, it should be appreciated that the robotic mower 10 is merely an example of a robotic vehicle that may employ an example embodiment. The robotic mower 10 may operate to cut grass on a parcel 20 (i.e., a land lot), the boundaries of which may be defined using one or more physical boundaries (e.g., a fence, wall, curb and/or the like), a guide wire 30 or combinations thereof. The guide wire 30 may emit electrical signals that are detectable by the robotic mower 10 to inform the robotic mower 10 when a boundary of the parcel 20 has been reached. The robotic mower 10 may be controlled, at least in part, via control circuitry 12 located onboard. The control circuitry 12 may include, among other things, the ability to detect the guide wire 30 to redirect the robotic mower 10 to other areas within the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry in a manner that enables the robotic mower 10 to systematically traverse the parcel 20 while operating a cutting blade to cut the grass on the work area of the parcel 20.

In some embodiments, the control circuitry 12 of the robotic mower 10 may be configured to communicate with an electronic device 42 (e.g., a computer, mobile telephone, PDA, smart phone, and/or the like) of a remote operator 44 via a wireless communication network 46. However, the wireless network 46 and other remote devices may not be employed in some embodiments, as described below. If employed, the wireless network 46 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. In some cases, the wireless network 46 may be a peer-to-peer (P2P) network or a proprietary network. Communication between the wireless network 46 and the devices or databases (e.g., servers, electronic device 42, control circuitry 12) may be accomplished by either wireline or wireless communication mechanisms and corresponding protocols.

Embodiments that employ wireless communication for control of the processing circuitry 12 may be remotely controllable using mobile phones or other remote control devices. However, the complexity of such a system may be considered excessive or unnecessary for some. Moreover, some may have concerns that hacking or password compromise may render remote controlled embodiments susceptible to security attacks. Thus, in some cases, it may be preferable to require the operator to interface with the robotic mower 10 locally at the robotic mower 10 itself. However, in many situations, since the robotic mower 10 may be operating in exposed or public areas, it is possible that an unauthorized party may approach the robotic mower 10 and attempt to interface with it locally.

In order to provide a solution that allows local interface with the robotic mower 10, but adds a further layer of security to prevent unauthorized access without the complexity of remote control, some embodiments may utilize a man-machine interface (MMI) or user interface that is detachable. Thus, for example, the operator may interface with the control circuitry 12 via a detachable user interface 49 to provide programming, operation instructions and/or the like to the robotic mower 10. The detachable user interface 49 may be mated with the control circuitry 12 locally at the robotic mower 10 to enable the operator to provide inputs to the control circuitry 12, but may be removed by the operator when the operator has completed interfacing with the control circuitry 12. Thus, an unauthorized party that attempts to manipulate the robotic mower will find that there is no apparent user interface at the robotic mower 10 to enable the party to provide programming or other inputs to the robotic mower 10.

Figure 2A:
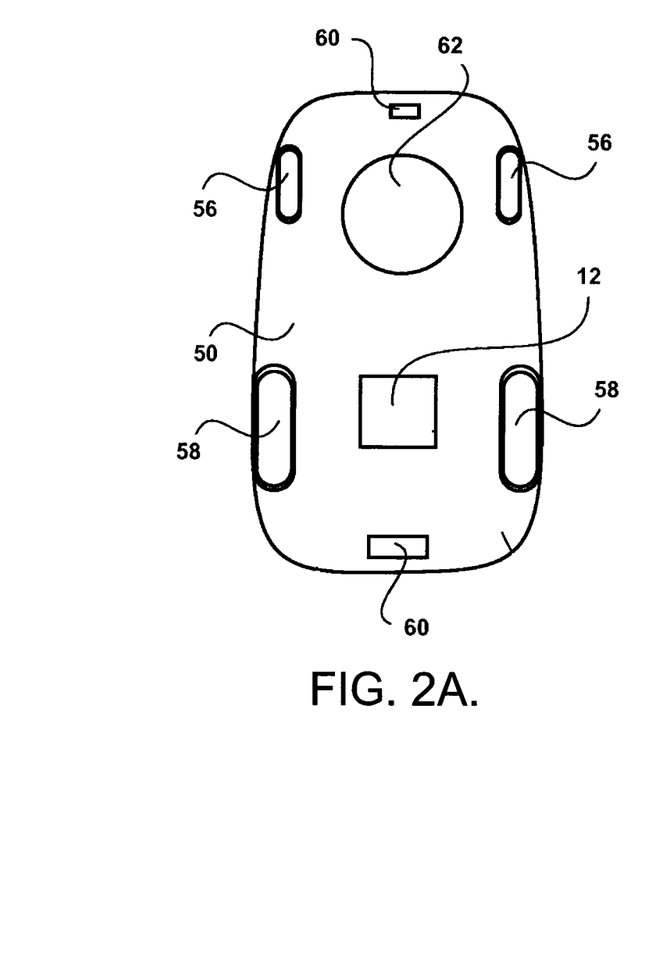
FIG. 2A illustrates a schematic view of a base plate and various components of the robotic mower according to an example embodiment.
Figure 2B:
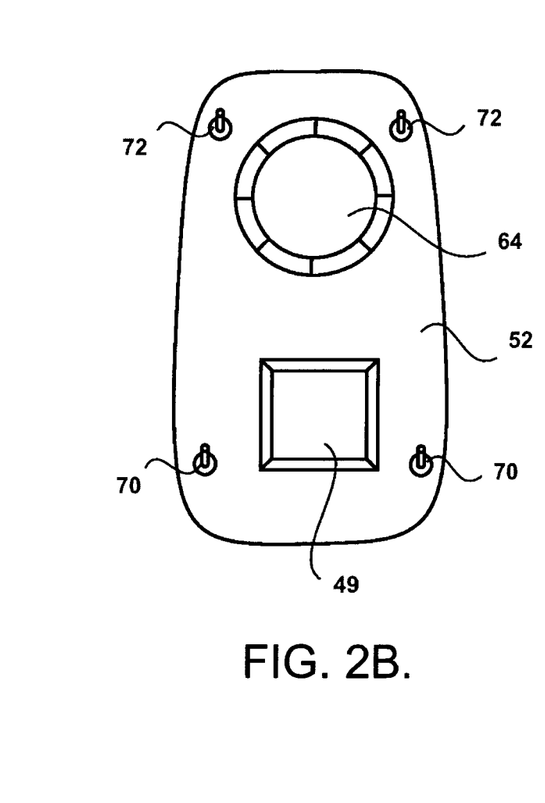
FIG. 2B illustrates a schematic view of an inner housing and various other components of the robotic mower according to an example embodiment.

FIG. 2, which includes FIGS. 2A and 2B, illustrates some of the parts that may be employed in connection with an example of the robotic mower 10. However, it should be appreciated that example embodiments may be employed on numerous other vehicles that may employ different designs. FIG. 2A illustrates a schematic view of a base plate and various components of the robotic mower according to an example embodiment and FIG. 2B illustrates a schematic view of an inner housing and various other components of the robotic mower according to an example embodiment.

Referring to FIGS. 1 and 2, the robotic mower 10 may include a base plate 50, an inner housing 52 and an outer housing 54. The inner housing 52 may be configured to be arranged on top of the base plate 50 and the outer housing 54 may be configured to be arranged on top of the inner housing 52. The base plate 50 may form a support structure from which one or more front wheels 56 and one or more rear wheels 58 may be supported. In some embodiments, the one or more rear wheels 58 may be relatively large as compared to the one or more front wheels 56. Moreover, the one or more rear wheels 58 may be configured to operate either in a forward or backward direction, but may otherwise not be steerable. However, the one or more front wheels 56 may be steerable responsive to control by the control circuitry 12. In some alternative embodiments, the rear wheels 58 may also be enabled to contribute to steering.

In an example embodiment, the base plate 50 may further include one or more sensors 60 that may be used to detect the guide wire 20 and/or objects that may form part of the boundary of the parcel. The sensors 60 may also detect objects that may be encountered during operation of the robotic mower 10 within the boundaries of the parcel 20. These objects may be fixed or temporary (e.g., movable) objects. In some cases, the sensors 60 may include a front sensor and a rear sensor. However, it should be appreciated that any number of sensors may be employed and they may be disposed at any desirable location on the robotic mower 10. The sensors 60 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 60 may be used, at least in part, for determining the location of the robotic mower 10 relative to boundaries or other points of interest (e.g., a starting point, the guide wire or other key features) of the parcel 20, or determining a position history or track of the robotic mower 10 over time.

The base plate 50 may further support a cutting engine 62 configured to drive a cutting blade or other cutters of the robotic mower 10. In some embodiments, the outer housing 54 and the inner housing 52 may be plastic, light metal, or other similarly lightweight components. The inner housing 52 may include a cover 64 for the cutting engine 62. In an example embodiment, a user interface (e.g., detachable user interface 49) may be provided to mate with either or both of the inner housing 52 and the outer housing 54. The detachable user interface 49 may be employed to interface with the control circuitry 12 for controlling operations of the robotic mower 10.

In some embodiments, the sensors 60 may include sensors specifically provided for detecting objects (other than the guide wire 20 or objects forming boundaries of the parcel 20) and/or sensors for detecting lifting (or tipping beyond a threshold amount) of the robotic mower 10. Alternatively, separate sensors (e.g., collision sensors 70 and lifting sensors 72) may be provided for each function, and those sensors may be capable of communicating with the control circuitry 12 in addition to the sensors 60. In an example embodiment, the sensors 60 may include a camera, which may be used to optically determine the existence of objects in view of the camera and, in some embodiments, may be configured to determine or distinguish an identity of the object (e.g., to determine if an object is a reference object).

As indicated above, some embodiments may provide a robotic vehicle (e.g., an autonomously operable robotic mower, watering robot, and/or the like) that employs the detachable user interface 49. The control circuitry 12 of the robotic vehicle (e.g., robotic mower 10) may enable the vehicle to operate autonomously or in a self-guided fashion (e.g., without direct and contemporaneous operator interaction) to mow, water, etc., the parcel 20. The robotic vehicle may then be steered or otherwise operated according to the settings, programming or instructional inputs that are stored at the control circuitry 12. In this regard, for example, the robotic vehicle may be steered away when any boundary is reached. Additionally or alternatively, the control circuitry 12 may be employed to provide feedback, warnings, or even implement automatic functionality (e.g., stopping blade rotation and/or stopping drive power application) responsive to detection of movement outside of the bounded area or detection of tipping of the vehicle or handling of the vehicle by an unauthorized party. However, according to an example embodiment, the settings, programming and other instructional inputs that define, limit or guide operation of the robotic mower 10 may be provided via the detachable user interface 49. Thus, for example, the detachable user interface 49 may be mated with the robotic mower 10 for the purpose of enabling the operator to interface with the control circuitry 12 of the robotic mower 10, but the detachable user interface 49 may be removed from the robotic mower 10 so that further interfacing with the control circuitry 12 is not possible after removal of the detachable user interface 49.

Figure 3:
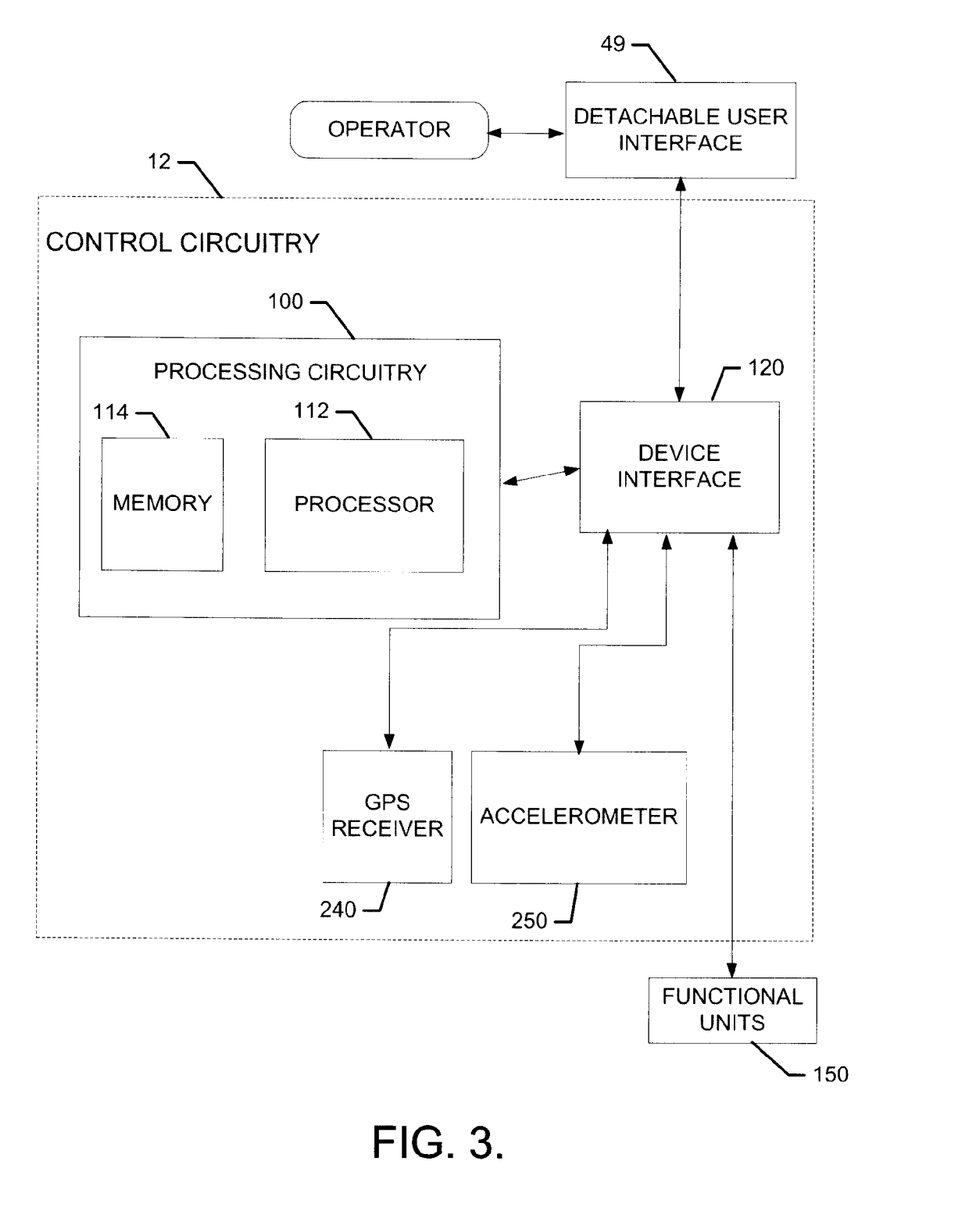
FIG. 3 illustrates a block diagram of various components of control circuitry of the robotic mower to illustrate some of the components that enable the functional performance of the robotic mower according to an example embodiment.

FIG. 3 illustrates a block diagram of various components of the control circuitry 12 to illustrate some of the components that enable the functional performance of the robotic mower 10 and to facilitate description of an example embodiment. In some example embodiments, the control circuitry 12 may include processing circuitry 100 that may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 100 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 100 may include one or more instances of a processor 112 and memory 114 that may be in communication with or otherwise control a device interface 120. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of an on-board computer. In some embodiments, the processing circuitry 100 may communicate with electronic components and/or sensors (e.g., sensors 60, collision sensors 70 and/or lifting sensors 72) of the robotic mower 10 via a single data bus. As such, the data bus may connect to a plurality or all of the switching components and/or other electrically controlled components of the robotic mower 10.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 100) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the memory 114 may include one or more non-transitory memory devices such as, for example, volatile and/or non-volatile memory that may be either fixed or removable. The memory 114 may be configured to store information, data, applications, instructions or the like for enabling the robotic mower 10 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from the sensor network. Among the contents of the memory 114, applications may be stored for execution by the processor 112 in order to carry out the functionality associated with each respective application.

The device interface 120 may include one or more interface mechanisms for enabling communication with other devices (e.g., sensors of a sensor network including sensors 60, collision sensors 70 and/or lifting sensors 72 and/or other accessories or functional units 150 such as motors, servos, switches, charging circuitry or other operational control devices for automatic responses). In some cases, the device interface 120 may further include a docking station to provide a physical connection with the detachable user interface 49. For example, the docking station may include electrical contacts that mate with corresponding electrical contacts of the detachable user interface 49 to enable the detachable user interface 49 to interact with the processing circuitry 100. Alternatively or additionally, the device interface 120 may include a physical docking station, but there may not be a physical communication interface between the detachable user interface 49 and the processing circuitry 100. Instead, a wireless communication mechanism may be employed, but the wireless communication mechanism may be enabled responsive to docking of the detachable user interface 49. In such an example, Bluetooth, Zigbee, WiFi, dedicated ISM radio links (e.g., 833 MHz), radio links employing IR, or any other suitable wireless communication protocol may be employed. Furthermore, in some embodiments, wireless communication mechanisms may employ synthetic voices or voice recognition technology.

Thus, in some embodiments, the device interface 120 may be any means such as a device or circuitry embodied in either hardware, or a combination of hardware and software that is configured to receive and/or transmit data from/to sensors or other external devices (e.g., the detachable user interface 49) in communication with the processing circuitry 100. In some example embodiments, the device interface 120 may provide interfaces for communication of components internal to robotic mower 10 or external to the robotic mower 10 so that the device interface 120 may provide interface capabilities for interaction with such components. Settings, programming and instructions for initiation of automatic responses such as operational control functions that implement automatic actions to be taken responsive to detection of certain stimuli may therefore be provided via the device interface 120 and the detachable user interface 49.

In embodiments employing a sensor network, the sensor network may include one or more sensors (e.g., sensors 60 and/or collision sensors 70 and lifting sensors 72) disposed at any of various locations on the robotic mower 10 to monitor various parameters. For example, one or more sensors may determine vehicle speed/direction, vehicle location, object presence, vehicle orientation and/or the like. Sensors may also be used to determine engine run time, machine work time, and other operational parameters. In some embodiments, positioning and/or orientation sensors (e.g., global positioning system (GPS) receiver 240 and/or accelerometer 250) may be included to monitor, display and/or record data regarding vehicle position and/or orientation.

The detachable user interface 49 may be in communication with the processing circuitry 100 when attached to the robotic mower 10 via the device interface 120. In some embodiments, the detachable user interface 49 may include its own instances of processing circuitry including a processor, memory, device interface and/or the like, which may be similar in form and/or function to that which is described above for the control circuitry 12. Regardless of the form chosen, the detachable user interface 49 may be configured to receive an indication of a user input provided thereat and/or to provide an audible, visual, mechanical or other output to the user. As such, the detachable user interface 49 may include, for example, a display (e.g., a touch screen display), one or more buttons or keys (e.g., function buttons), and/or other input/output mechanisms (e.g., microphone, speakers, cursor, joystick, lights and/or the like). However, in some embodiments, the display may not be provided on the detachable user interface 49, but instead may be provided on the robotic mower 10. Thus, for example, the keys, buttons or other input mechanisms to be employed, may be provided on the detachable user interface 49, while the display is provided on the robotic mower 10.

In an example embodiment, the detachable user interface 49 may be battery powered via rechargeable or disposable batteries. However, in some embodiments, the detachable user interface 49 may draw its power from the batteries of the robotic mower 10 to further provide for operation of the MMI only when the MMI (i.e., the detachable user interface 49) is coupled with the robotic mower 10. In some cases, the detachable user interface 49 may further employ a PIN code or other mechanism by which to pair the detachable user interface 49 with the control circuitry 12.

Figure 4:
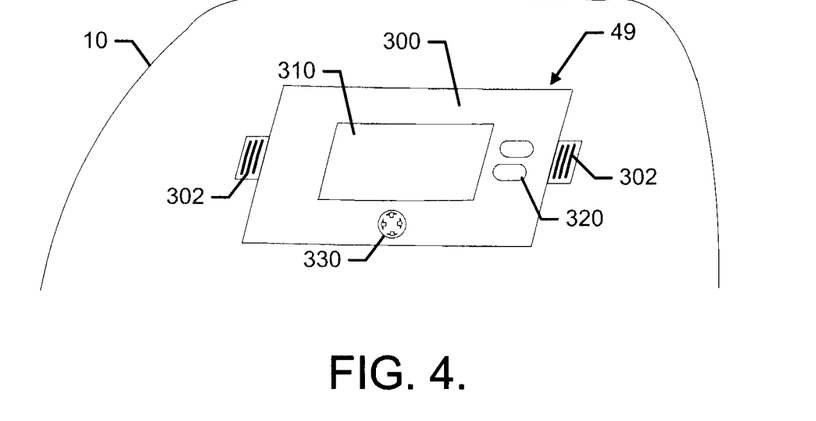
FIG. 4 illustrates one example form of a detachable user interface of an example embodiment.

FIG. 4 illustrates one example form the detachable user interface 49 might take in some example embodiments. In this regard, the detachable user interface 49 includes a casing 300 that may snap fit or otherwise mate with a portion of the robotic mower 10 to enable communication with the control circuitry 12 as described above. The snap fit may be provided via the provision of one or more detents or protrusions on either the casing 300 or on a portion of the receiving cavity into which the casing 300 is provided. The one or more detents or protrusions may then mate with corresponding receiving holes either in the receiving cavity or on the casing 300, but may be releasable when the operator grasps and withdraws the casing 300. As another alternative, retractable detents 302 may be spring loaded to engage the casing 300 when the casing 300 is installed in the receiving cavity. The operator may push the retractable detents 302 away from the casing 300 to enable the casing 300 to be withdrawn. Magnets, removable or rotatable straps, levers or other such devices may also be employed in some embodiments.

The detachable user interface 49 may further include a display 310, which as indicated above may be a touch screen display in some cases. However, in other cases, the display 310 may simply be an LCD screen or a set of indicating lamps that does not permit inputs to be provided thereat. The detachable user interface 49 may also include one or more function buttons 320 and/or an options navigator 330.

Some example embodiments may therefore enable autonomous or self-guided robotic vehicle operation based on instructions provided via a user interface that is only operable when docked, mated or otherwise proximate to the vehicle. The user interface can thereafter be removed to prevent tampering with vehicle operation settings. By using a user interface that is detachable instead of being remotely operable, staff with lower levels of authorization may still interface with the machine to maneuver the vehicle and provide setup instructions for the vehicle.

Thus, for example, a robotic vehicle may be provided, which may include control circuitry, a device interface and a detachable user interface. The control circuitry may be configured to execute stored instructions to direct autonomous or self-guided operation of the robotic vehicle on a defined area. The device interface may enable electronic communication of a device with the control circuitry. The detachable user interface may be configured to be removably mated with the robotic vehicle to enable communication between the detachable user interface and the control circuitry via the device interface. The detachable user interface may provide user interface capability to enable an operator to define one or more setting parameters or instructions responsive to the detachable user interface being mated with the robotic vehicle for execution by the control circuitry to control operation of the robotic vehicle when the detachable user interface is not mated with the robotic vehicle (e.g., autonomously or without contemporaneous operator interaction). However, it should be appreciated that the detachable user interface may also be useable when mated and, whether mated or not, may be useful for receiving fault notifications/error acknowledgements.

In some embodiments, the features above may be optionally modified or augmented. For example, in some example embodiments, the device interface may include a docking station with which the detachable user interface is configured to mate. In such an example, the docking station may include one or more electrical contacts configured to electrically mate with one or more electrical contacts of the detachable user interface responsive to insertion of the detachable user interface into the docking station. Alternatively or additionally, the docking station may include a wireless communication mechanism for interfacing with the detachable user interface responsive to insertion of the detachable user interface into the docking station. In some cases, the wireless communication mechanism employs voice recognition technology and/or various RF or other wireless communication protocols. In some cases, any or all of the above modifications may be included and the detachable user interface or the vehicle may include a display. Alternatively or additionally, any or all of the above modifications may be included and the detachable user interface may be powered from the robotic vehicle or from local batteries. Alternatively or additionally, any or all of the above modifications may be included and the detachable user interface may include a casing configured to snap fit with a housing of the robotic vehicle. The robotic vehicle may include retractable detents biased to engage the casing, rotatable levers, or magnets to hold the detachable user interface to the robotic vehicle. Alternatively or additionally, any or all of the above modifications may be included and the communication of setting parameters or instructions to the control circuitry is enabled responsive to entry of a code pairing the detachable user interface with the control circuitry.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A robotic vehicle comprising:
   control circuitry configured to execute stored instructions to direct operation of the robotic vehicle on a defined area;
   a device interface enabling electronic communication between one or more devices and the control circuitry; and
   a detachable user interface configured to be removably mated with the robotic vehicle to enable communication between the detachable user interface and the control circuitry via the device interface, the detachable user interface providing user interface capability to enable an operator to define one or more setting parameters or instructions responsive to the detachable user interface being mated with the robotic vehicle for execution by the control circuitry to control operation of the robotic vehicle when the detachable user interface is not mated with the robotic vehicle, wherein being mated comprises at least a portion of a detachable user interface housing being received within a docking station of the detachable user interface.

2. The robotic vehicle of claim 1, wherein the docking station includes one or more electrical contacts configured to electrically mate with one or more electrical contacts of the detachable user interface responsive to insertion of the detachable user interface into the docking station.

3. The robotic vehicle of claim 1, wherein the docking station includes a wireless communication mechanism for interfacing with the detachable user interface responsive to insertion of the detachable user interface into the docking station.

4. The robotic vehicle of claim 3, wherein the wireless communication mechanism employs voice recognition technology.

5. The robotic vehicle of claim 1, wherein the detachable user interface includes a display.

6. The robotic vehicle of claim 1, wherein the detachable user interface is powered from the robotic vehicle or includes an onboard power supply.

7. The robotic vehicle of claim 1, wherein the detachable user interface includes a casing configured to snap fit with a housing of the robotic vehicle.

8. The robotic vehicle of claim 7, wherein the robotic vehicle includes retractable detents biased to engage the casing, rotatable levers, or magnets to hold the detachable user interface to the robotic vehicle.

9. The robotic vehicle of claim 1, wherein the communication of setting parameters or instructions to the control circuitry is enabled responsive to entry of a code pairing the detachable user interface with the control circuitry.

10. A detachable user interface comprising processing circuitry configured to interface with control circuitry of a robotic vehicle responsive to mating of the detachable user interface with the robotic vehicle via a device interface of the robotic vehicle,
wherein the control circuitry is configured to execute stored instructions to direct operation of the robotic vehicle on a defined area, and
wherein the detachable user interface is configured to be removably mated with the robotic vehicle to enable communication between the detachable user interface and the control circuitry via the device interface, the detachable user interface providing user interface capability to enable an operator to define one or more setting parameters or instructions responsive to the detachable user interface being mated with the robotic vehicle for execution by the control circuitry to control operation of the robotic vehicle when the detachable user interface is not mated with the robotic vehicle, wherein being mated comprises at least a portion of a detachable user interface housing being received within a docking station of the detachable user interface.

11. The detachable user interface of claim 10, wherein the detachable user interface includes one or more electrical contacts configured to electrically mate with one or more electrical contacts of the docking station responsive to insertion of the detachable user interface into the docking station.

12. The detachable user interface of claim 10, wherein the detachable user interface includes a wireless communication mechanism for interfacing with the docking station responsive to insertion of the detachable user interface into the docking station.

13. The detachable user interface of claim 12, wherein the wireless communication mechanism employs voice recognition technology.

14. The detachable user interface of claim 10, wherein the detachable user interface includes a display.

15. The detachable user interface of claim 10, wherein the detachable user interface is powered from the robotic vehicle.

16. The detachable user interface of claim 10, wherein the detachable user interface includes a casing configured to snap fit with a housing of the robotic vehicle.

17. The detachable user interface of claim 16, wherein the robotic vehicle includes retractable detents biased to engage the casing, rotatable levers, or magnets to hold the detachable user interface to the robotic vehicle.

18. The detachable user interface of claim 10, wherein the communication of setting parameters or instructions to the control circuitry is enabled responsive to entry of a code pairing the detachable user interface with the control circuitry.

* * * * *